(12) United States Patent
Yamamoto

(10) Patent No.: US 11,207,811 B2
(45) Date of Patent: Dec. 28, 2021

(54) INJECTION-MOLDING MACHINE

(71) Applicant: MITSUBISHI HEAVY INDUSTRIES, LTD., Tokyo (JP)

(72) Inventor: Kunio Yamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 249 days.

(21) Appl. No.: 16/474,401

(22) PCT Filed: Nov. 21, 2017

(86) PCT No.: PCT/JP2017/041839
§ 371 (c)(1),
(2) Date: Jun. 27, 2019

(87) PCT Pub. No.: WO2018/154889
PCT Pub. Date: Aug. 30, 2018

(65) Prior Publication Data
US 2019/0344487 A1    Nov. 14, 2019

(30) Foreign Application Priority Data

Feb. 27, 2017  (JP) .............................. JP2017-034501

(51) Int. Cl.
*B29C 45/26*    (2006.01)
*B29C 45/00*    (2006.01)
(Continued)

(52) U.S. Cl.
CPC ...... *B29C 45/2681* (2013.01); *B29C 45/0005* (2013.01); *B29K 2101/12* (2013.01); *B29K 2307/04* (2013.01); *B29L 2031/08* (2013.01)

(58) Field of Classification Search
None
See application file for complete search history.

(56) References Cited

U.S. PATENT DOCUMENTS 3,468,997 A * 9/1969 Pickels ................. F16F 15/305
                                                  264/108
3,487,140 A * 12/1969 Laux ....................... B28B 21/74
                                                  264/154
(Continued)

FOREIGN PATENT DOCUMENTS

JP    02-099614    8/1990
JP    07-9495      1/1995
(Continued)

OTHER PUBLICATIONS

English translation of the International Preliminary Report on Patentability and Written Opinion of the International Searching Authority dated Aug. 27, 2019 in International (PCT) Application No. PCT/JP2017/041839.

(Continued)

*Primary Examiner* — Edmund H Lee
(74) *Attorney, Agent, or Firm* — Wenderoth, Lind & Ponack, L.L.P.

(57) ABSTRACT

An injection-molding machine (10) has a static mold (14), a mold shaft (15) inserted into an inner space (14a) of the static mold (14) and having a central axis (15a), a rotation mechanism (17) which rotates the mold shaft (15) around the central axis (15a), and a raw material injection mechanism (1) which injects as a raw material, a composite material containing resin and fiber into the inner space (14a) of the static mold (14). The raw material is injected from a tip section of the mold shaft (15) into the inner space (14a) of the static mold (14) along the mold shaft (15). A technique of properly controlling the fiber orientation in the injection molding of the composite material part is provided.

6 Claims, 7 Drawing Sheets

(51) Int. Cl.
   *B29K 101/12*   (2006.01)
   *B29K 307/04*   (2006.01)
   *B29L 31/08*    (2006.01)

(56) References Cited

U.S. PATENT DOCUMENTS

| | | | | |
|---|---|---|---|---|
| 3,907,952 | A | * | 9/1975 | Cleereman ......... B29C 45/5605 |
| | | | | 264/40.5 |
| 4,088,729 | A | * | 5/1978 | Sherman ................ B24D 18/00 |
| | | | | 264/259 |
| 4,288,478 | A | * | 9/1981 | Kinoshita ........... B29C 45/5605 |
| | | | | 215/42 |
| 5,753,159 | A | * | 5/1998 | Cao ...................... B29C 39/123 |
| | | | | 264/312 |
| 5,804,125 | A | * | 9/1998 | Aepli ................. B29C 45/0025 |
| | | | | 264/310 |
| 6,100,611 | A | * | 8/2000 | Nakase .............. B29C 45/0025 |
| | | | | 264/328.12 |
| 9,669,570 | B2 | | 6/2017 | Godon et al. |
| 10,309,411 | B2 | | 6/2019 | Honda |

| | | | |
|---|---|---|---|
| 2009/0046960 | A1 | 2/2009 | Hibi et al. |
| 2014/0124987 | A1 | 5/2014 | Godon et al. |
| 2014/0255199 | A1 | 9/2014 | Honda |
| 2018/0370105 | A1 * | 12/2018 | Yamaguchi ........... F04D 29/023 |

FOREIGN PATENT DOCUMENTS

| | | | |
|---|---|---|---|
| JP | 10-95035 | | 4/1998 |
| JP | 2003-138054 | | 5/2003 |
| JP | 2007-170578 | | 7/2007 |
| JP | 2008-032081 | | 2/2008 |
| JP | 2014-517779 | | 7/2014 |
| JP | 2014-173456 | | 9/2014 |
| JP | 2014-237301 | | 12/2014 |
| JP | 2017113973 | * | 6/2017 |
| WO | 2017/110768 | | 6/2017 |

OTHER PUBLICATIONS

International Search Report dated Jan. 16, 2018 in International (PCT) Application No. PCT/JP2017/041839.

* cited by examiner

INJECTION-MOLDING MACHINE

TECHNICAL FIELD

The present invention relates to an injection-molding machine, a mold assembly, and a method of manufacturing a part formed of a composite material (hereinafter, to be merely referred to "a composite material part"), and especially, to an injection-molding machine and method for manufacturing a composite material part by injection molding.

BACKGROUND ART

A composite material (e.g. carbon fiber reinforced plastics) in which resin and fiber are combined is applied to various fields because it is light weight and high strength. CFRP (carbon fiber reinforced plastics) and GFRP (glass fiber reinforced plastics) are typical examples of composite material. CFRP is widely applied as the member configuring an aircraft because of light weight and high strength.

One of techniques used to shape the composite material part is injection molding. In the shaping of the composite material part by the injection molding, the resin containing fiber is injected inside a mold, and thus, the composite material part is shaped to have a desired shape. The injection molding is suitable to integrally shape a composite material part having a complicated structure. The technique of shaping a composite material part by the injection molding is disclosed in, for example, JP 2014-517779A (Patent Literature 1).

JP H10-95035A (Patent Literature 2) relates to a technique of shaping a composite material part by injection molding, and points out the importance of a flow direction of resin. Patent Literature 2 discloses a manufacturing method and a manufacturing apparatus for applying an orientation to an injection molding product by rotating a rotating body in a mold. Also, JP H07-9495A (Patent Literature 3) discloses a method of manufacturing a pipe in which an injection molding is carried out while rotating a rotary core section in an outer mold.

However, according to consideration by the inventor, the above-mentioned injection molding techniques have a room of improvement in the control of orientation of the fiber contained in the resin. The orientation of fiber in the shaped composite material part has an influence on the mechanical strength of the composite material part. Therefore, when the composite material part is shaped by the injection molding, it is desirable to properly control the orientation of fiber.

As the technique related to the present invention, JP 2014-237301A (Patent Literature 4) discloses a method of manufacturing a rotating body of a fluid machine. Patent Literature 4 discloses a technique of carrying out an injection molding into a mold in which a preformed product formed of prepreg is set.

CITATION LIST

Patent Literature

[Patent Literature 1] JP 2014-517779A
[Patent Literature 2] JP H10-95035A
[Patent Literature 3] JP H07-9495A
[Patent Literature 4] JP 2014-237301A

SUMMARY OF THE INVENTION

Therefore, one of the objects of the present invention is to provide a technique of properly control the orientation of fiber in injection molding of a composite material part. The other objects and the new features of the present invention would be understood by a skilled person from the following disclosure.

According to an aspect of the present invention, an injection-molding machine includes a static mold; a mold shaft inserted into an inner space of the static mold and having a central axis; a rotation mechanism configured to rotate the mold shaft around the central axis; and a raw material injection mechanism configured to inject as a raw material, a composite material containing resin and fiber into the inner space of the static mold.

The raw material is injected into the inner space of the static mold along the mold shaft.

In an embodiment, the injection-molding machine further includes a rectification mechanism having a rectification wing configured to rectify a flow of the raw material to turn in a rotation direction of the mold shaft around the mold shaft.

In an embodiment, the static mold has a concave section in which a tip section of the mold shaft is inserted, and the raw material is injected into the inner space of the static mold through a gap between the concave section and the mold shaft.

In an embodiment, the static mold has a throat receiving the raw material from a cylinder of the raw material injection mechanism, the raw material flows toward the tip section of the mold shaft from the throat, and the rectification mechanism is installed upstream of the throat in the flow of raw material inside the cylinder.

In another aspect of the present invention, the injection-molding machine includes a mold; a mold shaft inserted into an inner space of the mold and having a cylindrical side surface in the inner space; a raw material injection mechanism configured to inject as the raw material, the composite material containing resin and fiber into the inner space of the mold; and a rectification mechanism having a rectification wing. The raw material is injected into the inner space of the mold along the mold shaft. The rectification wing rectifies a flow of the raw material for the flow of raw material to turn around the mold shaft.

In another aspect of the present invention, a mold assembly includes a static mold having an inner space into which a composite material containing resin and fiber is injected as a raw material; a mold shaft inserted into the inner space of the static mold and having a central axis; and a rotation mechanism configured to rotate the mold shaft around the central axis. The raw material is injected into the inner space of the static mold along the mold shaft.

According to another aspect of the present invention, a method of manufacturing a composite material part includes preparing a mold assembly having a static mold and a mold shaft inserted into an inner space of the static mold and having a central axis; and shaping a composite material part by injecting as a raw material, a composite material containing resin and fiber into the inner space in a state that the mold shaft is rotated around the central axis. The raw material of the composite material is injected into the inner space of the static mold along the mold shaft.

In another aspect of the present invention, a method of manufacturing a composite material part includes preparing a mold assembly having a mold and a mold shaft inserted into an inner space of the mold and having a central axis, and a rectification mechanism having a rectification wing; and shaping a composite material part by injecting as a raw material, a composite material containing resin and fiber into the inner space of the mold. The raw material is injected into the inner space of the mold along the mold shaft. At this time, a flow of the raw material is rectified by the rectification wing such that the flow of raw material turns around the mold shaft.

The above-mentioned method of manufacturing the composite material part is useful especially when the composite material part has a hub and a wing united to the hub in a wing root.

According to the present invention, the technique of properly controlling the orientation of fiber in the injection molding of the composite material part can be provided.

DESCRIPTION OF THE EMBODIMENTS

Figure 1:
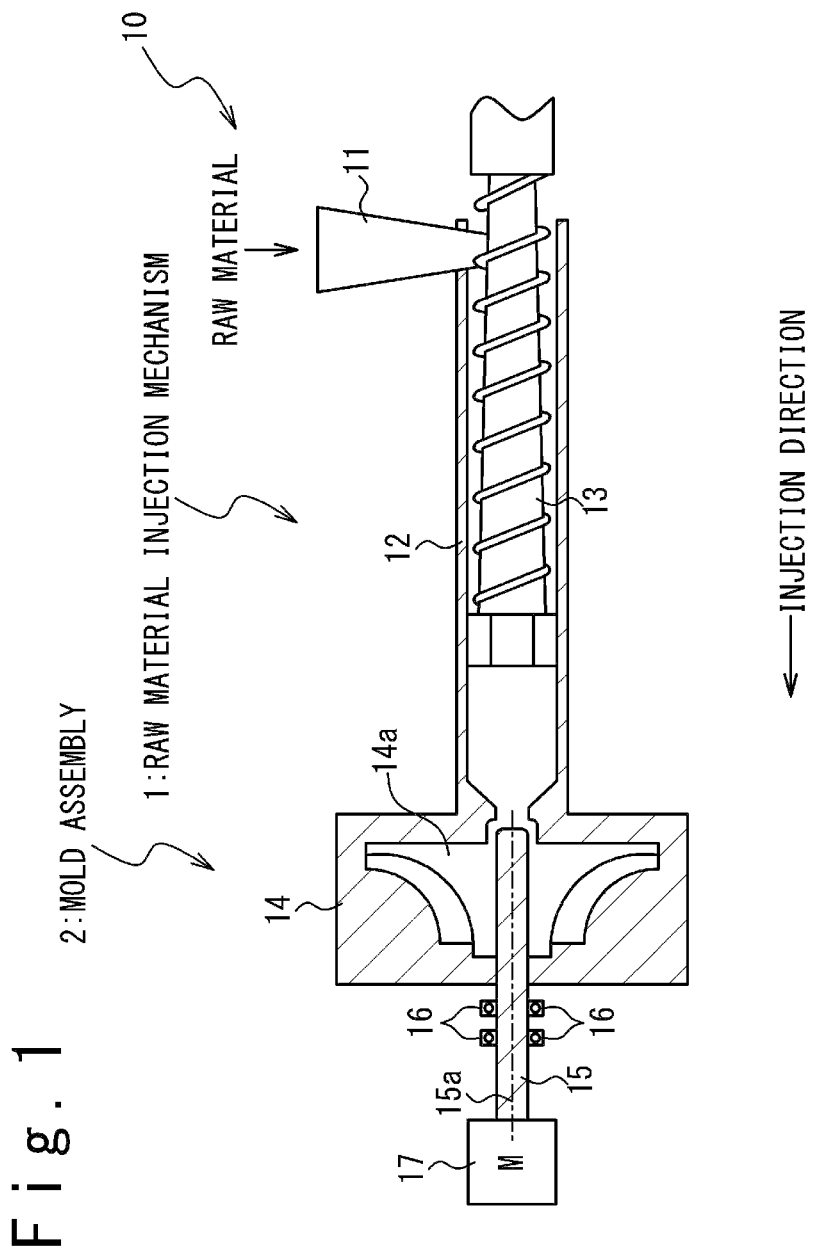
FIG. 1 is a conceptual diagram showing a configuration of an injection-molding machine in a first embodiment.

FIG. 1 is a conceptual diagram showing a configuration of injection-molding machine 10 according to a first embodiment of the present invention. The injection-molding machine 10 in the present embodiment is a machine for manufacturing a composite material part formed of a composite material in which resin and fiber are combined, and has a raw material injection mechanism 1 and a mold assembly 2. Here, the resin is a thermoplastic resin and the fiber is carbon fiber.

The raw material injection mechanism 1 injects a melted raw material into the mold assembly 2, and has a hopper 11, a cylinder 12 and a screw 13. The hopper 11 receives the raw material containing the resin and the fiber to supply to the inside of the cylinder 12. The cylinder 12 has been heated, and the raw material is dissolved and liquefied inside the cylinder 12. That is, the raw material has liquidity inside the cylinder 12. The screw 13 injects the liquefied raw material into the mold assembly 2 in a high pressure. The direction to which the raw material injection mechanism 1 having such a configuration injects the raw material is shown as "an injection direction" in FIG. 1.

Figure 6:
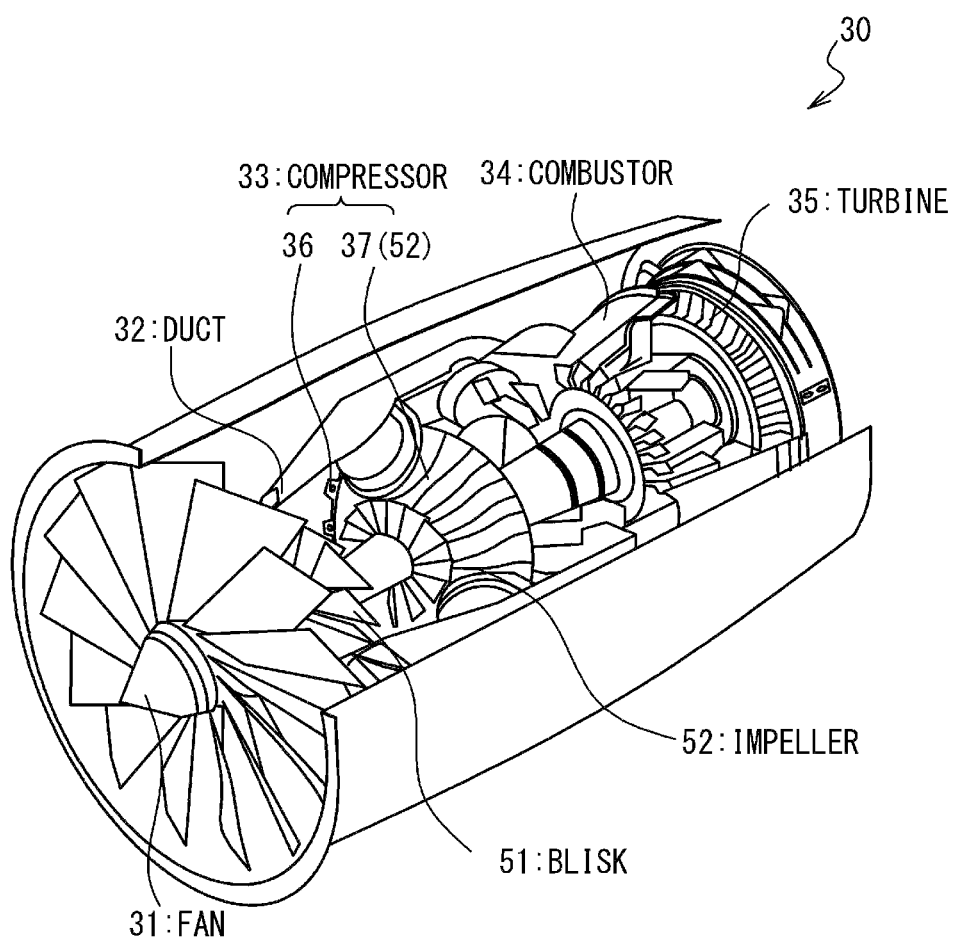
FIG. 6 is a perspective view showing an example of configuration of an aircraft jet engine.

The mold assembly 2 has a static mold 14, a mold shaft 15, a bearing 16 and a shaft rotation mechanism 17. The static mold 14 has an inner space 14a formed therein which has a shape corresponding to the composite material part to be shaped. The inner space 14a has the shape corresponding to a blisk shape or an impeller shape in the compressor 33 of the aircraft jet engine 30 shown in FIG. 6 to be mentioned later. In FIG. 6 to be mentioned later, the blisk 51 and the impeller 52 has a hub 44 and wings 45. The above-mentioned raw material injection mechanism 1 injects the liquefied raw material into the inner space 14a of the static mold 14. A mold shaft 15 is held by the bearing 16 to be rotatable around the central axis 15a. A part of mold shaft 15 is inserted into the inner space 14a of the static mold 14. The part of the mold shaft 15 which is situated inside the inner space 14a of the static mold 14 has a cylindrical side surface with the central axis 15a as a center. The mold shaft 15 is rotated by the shaft rotation mechanism 17.

Figure 2:
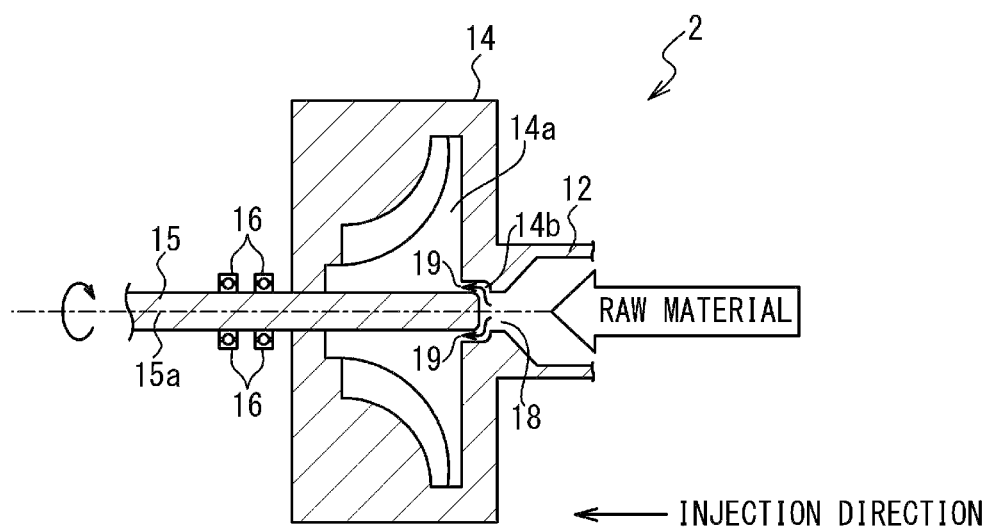
FIG. 2 is a cross sectional view showing a configuration of a mold assembly in the first embodiment.

FIG. 2 is an expanded cross sectional view showing the structure of mold assembly 2. The static mold 14 has a throat 18 receiving the liquefied raw material from the raw material injection mechanism 1, and the raw material is injected into the inner space 14a of the static mold 14 through the throat 18. In the present embodiment, the throat 18 is provided on a position where a prolongation of the central axis 15a of the mold shaft 15 passes through the throat 18. The mold shaft 15 is inserted into the inner space 14a of the static mold 14 such that the tip section of the mold shaft 15 reaches the neighborhood of throat 18. The mold shaft 15 is supported by the bearing 16 outside the static mold 14 and is supported by no kind of member in the inner space 14a of the static mold 14.

A concave section 14b is formed in the neighborhood of the throat 18 of the static mold 14 to have a shape corresponding to the shape of the tip section of the mold shaft 15. The tip section of the mold shaft 15 is inserted into the concave section 14b. The static mold 14 and the mold shaft 15 oppose to each other in the concave section 14b to put a gap 19 between them.

Below, a method of manufacturing a composite material part by using the injection-molding machine 10 in the present embodiment will be described. In the present embodiment, the composite material part is manufactured by the injection molding by using the injection-molding machine 10. In a process of injection molding, the mold assembly 2 of the above-mentioned configuration is prepared and is coupled with the raw material injection mechanism 1. The raw material containing fiber and resin is supplied to the hopper 11 of the raw material injection mechanism 1. The supplied raw material is introduced into the cylinder 12 from the hopper 11 and is liquefied. Moreover, the liquefied raw material is injected into the inner space 14a along the mold shaft 15 by the raw material injection mechanism 1 in the state that the mold shaft 15 is rotate by the shaft rotation mechanism 17. Thus, a flow of raw material is formed in the inner space 14a of the static mold 14 such that the fiber is oriented in a direction desirable to improve the mechanical strength of the composite material part to be shaped.

In detail, the liquefied raw material is supplied to the throat 18 from the raw material injection mechanism 1, and moreover flows toward the tip section of the mold shaft 15 from the throat 18. The raw material has reached the neighborhood of the tip section of the mold shaft 15 and then is injected into the inner space 14a of the static mold 14 through the gap 19 provided between the static mold 14 and the mold shaft 15. A flow of raw material is generated along the mold shaft 15 in the neighborhood of mold shaft 15 to turn to the rotation direction of the mold shaft 15 around of the central axis 15a. That is, in the neighborhood of the mold shaft 15, the flow of raw material has an axial direction component leaving the throat 18 (a component in a direction leaving the throat 18 and a direction parallel to the central axis 15a) and a circumferential direction component coincident with the rotation direction of the mold shaft 15. The fiber contained in the raw material is oriented to a direction along such a flow of raw material. The orientation of the fiber to the direction is desirable for improvement of the composite material part in mechanical strength. Also, in the whole inner space 14a of the static mold 14, the raw material flows to a direction leaving the mold shaft 15 while having the circumferential direction component. The fiber is oriented to the direction along the flow of the raw material. The orientation of such a fiber contributes to the improvement of the composite material part in the mechanical strength.

As described above, the injection-molding machine 10 in the first embodiment can properly control the orientation of fiber in the composite material part by controlling the flow of raw material in the inner space 14a of the static mold 14. This is effective to the improvement of the composite material part in mechanical strength.

Figure 3:
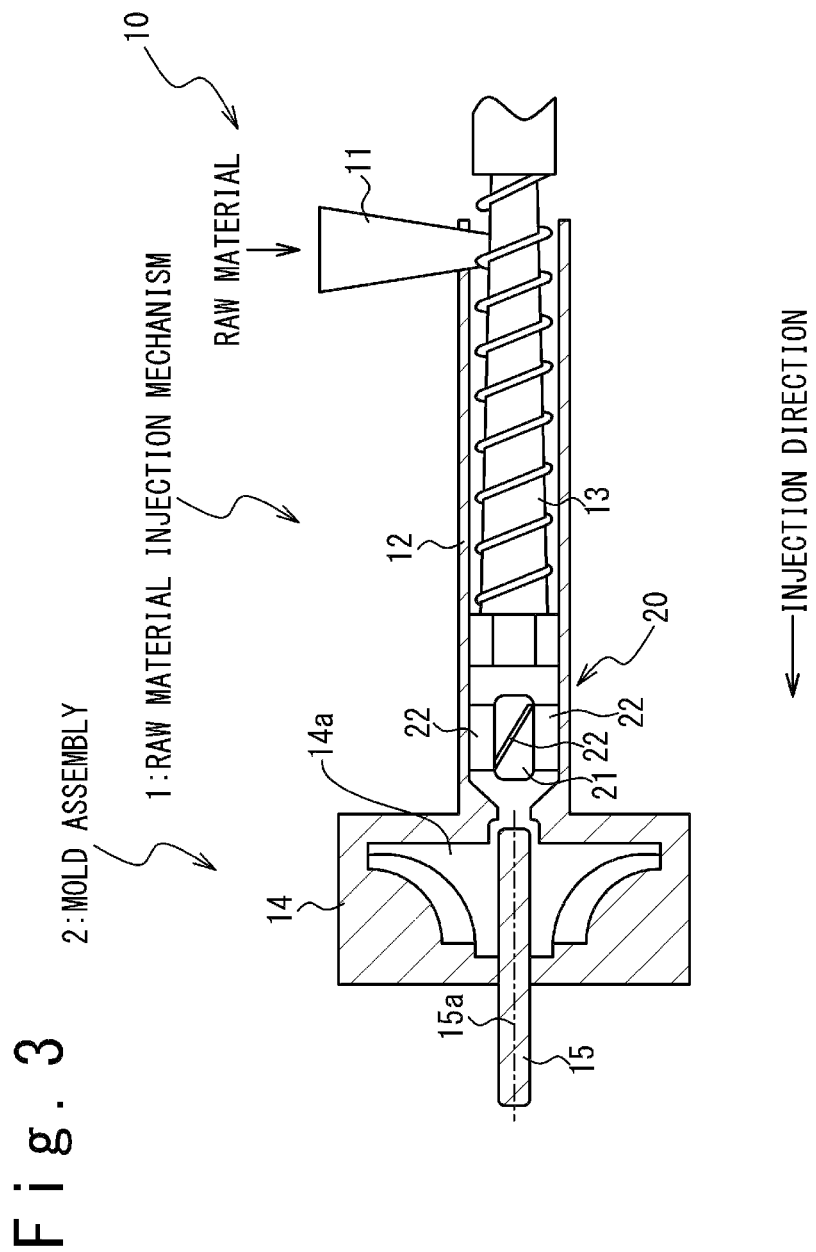
FIG. 3 is a conceptual diagram showing a configuration of the injection-molding machine in a second embodiment.
Figure 4:
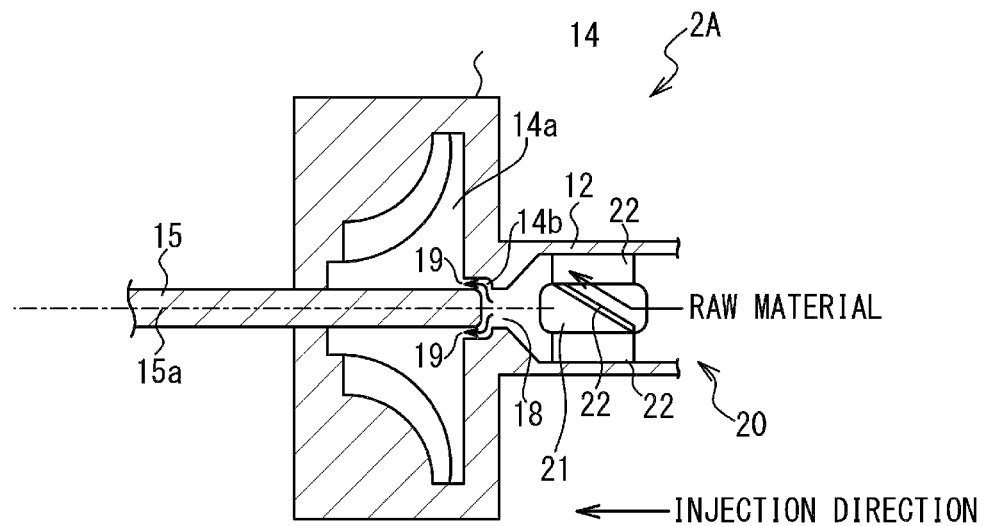
FIG. 4 is a partial cross sectional view showing a configuration of the mold assembly in the second embodiment.

FIG. 3 is a diagram showing a configuration of injection-molding machine 10 in a second embodiment. FIG. 4 is a diagram showing a configuration of a mold assembly 2A in the second embodiment. The configuration of mold assembly 2A in the second embodiment is similar to that of the mold assembly 2 in the first embodiment. However, the mold assembly 2A in the second embodiment is different from the mold assembly 2 in the first embodiment in that the mold shaft 15 is not rotated but is fixed. Accompanying such a change, the shaft rotation mechanism 17 and the bearing 16 to support the mold shaft 15 to be rotatable are not provided. Instead, in the second embodiment, a rectification mechanism 20 is provided to generate a flow of raw material turning around the central axis 15a along the mold shaft 15 by using rectification wings.

In the present embodiment, the rectification mechanism 20 is situated upstream of the throat 18 in the flow of raw material, and is housed inside the cylinder 12. The rectification mechanism 20 has a support member 21 and a plurality of rectification wings 22. Each of the rectification wings 22 is joined to the support member 21 in a wing root and joined to the cylinder 12 in a wing tip.

In the injection molding by the injection-molding machine 10 of the present embodiment, the flow of raw material is controlled by the rectification wings 22. In detail, in the injection molding by the injection-molding machine 10 of the present embodiment, the mold assembly 2A of the above-mentioned configuration is prepared and is coupled with the raw material injection mechanism 1. Moreover, the raw material is injected into the inner space 14a along the mold shaft 15 by the raw material injection mechanism 1. In the present embodiment, the flow of raw material is controlled such that the flow of raw material turns around the central axis 15a in the position of the throat 18 by the rectification wings 22 of the rectification mechanism 20. Thus, the flow of raw material is formed to turn around the central axis 15a along the mold shaft 15 in the inner space 14a of the static mold 14. That is, in the neighborhood of the mold shaft 15, the flow of raw material has an axial direction component leaving the throat 18 (a component in a direction leaving the throat 18 and a direction parallel to the central axis 15a) and a circumferential direction component coincident with the rotation direction of the mold shaft 15. The fiber contained in the raw material is oriented to direction along such a flow of raw material. The orientation of the fiber to such a direction is desirable for improvement of the composite material part in mechanical strength. Also, in the whole inner space 14a of the static mold 14, the raw material flows to the direction leaving the mold shaft 15 while having the circumferential direction component, and the fibers are oriented to the direction along the flow of raw material. The orientation of fibers contributes to improvement of the composite material part in mechanical strength.

As described above, even in the injection-molding machine 10 in the second embodiment, it is possible to control the orientation of fiber of the composite material part properly and to improve the composite material part in mechanical strength, by controlling the flow of raw material in the inner space 14a of the static mold 14.

Figure 5:
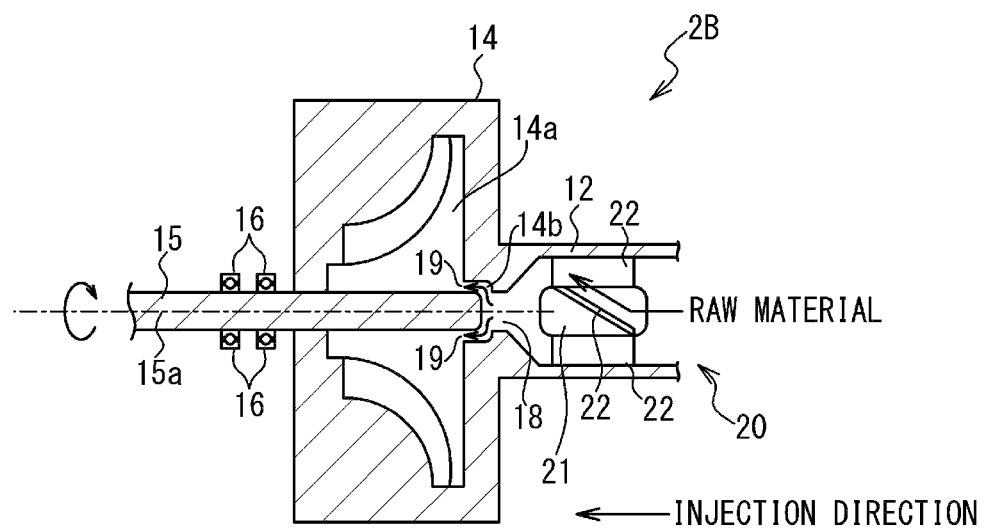
FIG. 5 is a partial cross sectional view showing a configuration of the mold assembly in a third embodiment.

FIG. 5 is a diagram showing a configuration of injection-molding machine 10 in a third embodiment, especially, a configuration of mold assembly 2B. The configuration of injection-molding machine 10 in the third embodiment is a combination of the configuration in the first embodiment and the configuration in the second embodiment. In detail, in the third embodiment, the mold shaft 15 is supported by the bearing 16 rotatably and rotated by the shaft rotation mechanism 17, like the first embodiment. In addition, in the configuration of FIG. 5, the rectification mechanism 20 is provided for the injection-molding machine 10 to generate the flow of raw material which turns around the central axis 15a along the mold shaft 15 by using the rectification wings 22, like the second embodiment. The rectification wings 22 of the rectification mechanism 20 has the shape and arrangement in such a manner that the turning direction of the flow of raw material through the operation of the rectification wings 22 is coincident with the rotation direction of the mold shaft 15.

Even in the injection-molding machine 10 of the third embodiment, it is possible to control the orientation of fiber of the composite material part properly and to improve the composite material part in mechanical strength, by controlling the flow of raw material in the inner space 14a of the static mold 14. According to the configuration of FIG. 5, the force to make the flow of raw material turn around the central axis 15a along the mold shaft 15 becomes stronger. It is desirable for the improvement of the composite material part in mechanical strength in the circumferential direction of the central axis 15a.

The injection-molding machine 10 in the above-mentioned embodiments (the first to third embodiments) is suitable to manufacture the composite material part which has the hub having a part of a cylindrical shape and the wings united to the hub in the wing root. The hub having the cylindrical part can be formed by using the mold shaft 15 as a core. At this time, it is effective for improvement of the strength of the hub to form the flow of raw material which turns around the central axis 15a along the mold shaft 15.

As an example of such a composite material part, a duct to introduce air into a compressor of an aircraft jet engine, and a rotor and a stator of the compressor are given. In recent years, the lightening of an aircraft jet engine is strongly demanded. The applicant is considering application of a composite material part to a part configuring the compressor of the aircraft jet engine. Because the compressor is comparatively cold although the heat-resistant temperature of the composite material is not so high, it is possible to use the composite material part as a part configuring the compressor. On the other hand, the part configuring the compressor is required to have a high mechanical strength. According to the injection molding using the injection-molding machine 10 of the present embodiment, it is possible to respond such a request.

FIG. 6 is a perspective view showing a configuration example of the aircraft jet engine 30 in which the composite material part is used. In the example of FIG. 6, the aircraft jet engine 30 has a fan 31, a duct 32, a compressor 33, a combustor 34 and a turbine 35. The fan 31 is connected to the turbine 35 and is driven by it to generate a flow of air. A part of the flow of air generated by the fan 31 is emitted to the rear section of the aircraft jet engine 30 and used to generate propulsion. The remainder is supplied to the compressor 33 through the duct 32. The duct 32 is situated downstream of the fan 31, and rectifies the flow of air from the fan 31 to supply to the compressor 33. The compressor 33 compresses the supplied air to supply to the combustor 34. The combustor 34 mixes the compressed air and fuel and combusts the mixture to generate a combustion gas. The turbine 35 is driven with the generated combustion gas and generates rotation energy to drive the fan 31 and the compressor 33. The combustion gas discharged from the turbine 35 is used for the propulsion. The injection molding technique shown in the above-mentioned embodiments is useful when the composite material parts are used as the duct 32 of the aircraft jet engine 30 of FIG. 6 and the rotor 36 and the stator 37 in the compressor 33.

Figure 7:
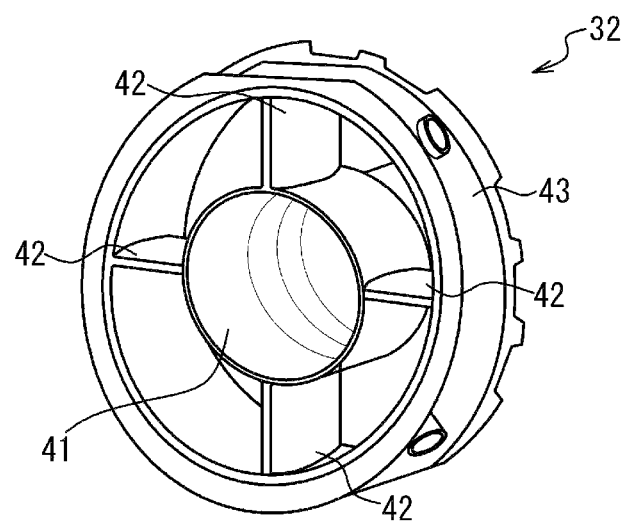
FIG. 7 is a perspective view showing an example of structure of a duct of the aircraft jet engine shown in FIG. 6.

FIG. 7 shows an example of structure of the duct 32 of the aircraft jet engine 30. The duct 32 has a hub 41, rectification wings 42 and an outer casing 43. The rectification wing 42 is united to the hub 41 in the wing root, and united to the outer casing 43 in the wingtip. The injection molding by the above injection-molding machine 10 in the present embodiment is suitable to form the duct 32 of such a structure by integral molding.

Figure 8:
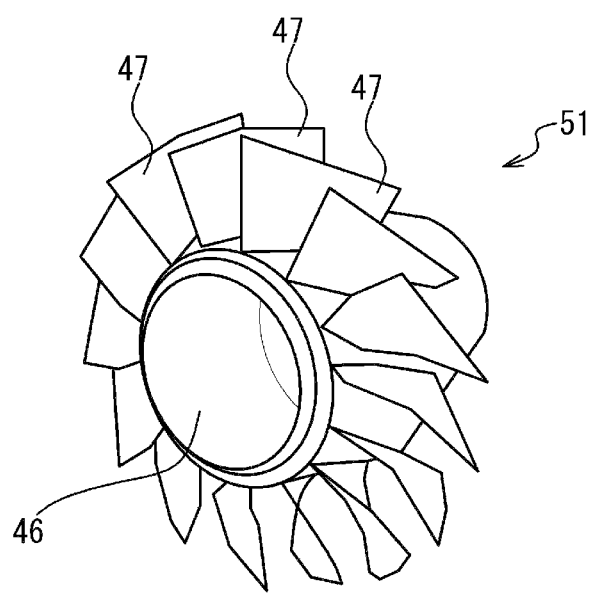
FIG. 8 is a perspective view showing an example of a blisk of a rotor structure of a compressor of the aircraft jet engine shown in FIG. 6.
Figure 9:
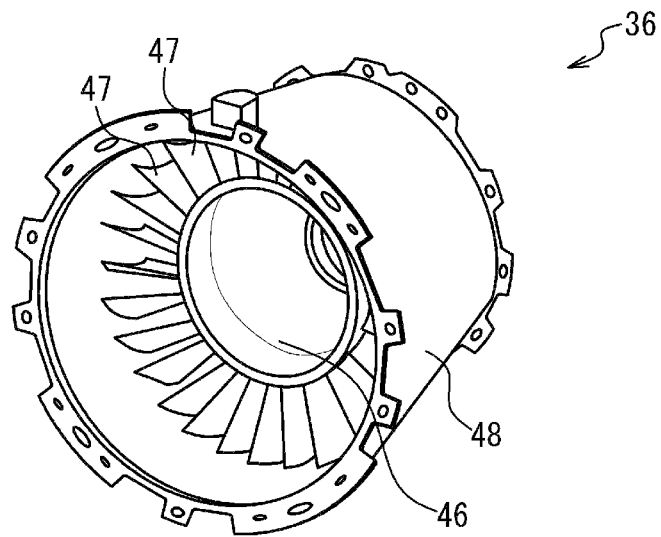
FIG. 9 is a perspective view showing an example of structure of a rotor of the compressor of the aircraft jet engine shown in FIG. 6.

FIG. 8 shows an example of blisk 51 in the structure of the rotor 36 of the compressor 33 of the aircraft jet engine 30. The blisk 51 of the rotor 36 has a hub 46 and wings 47. The wings 47 are united to the hub 46 in the wing root. The injection molding by the above injection-molding machine 10 of the present embodiment is suitable to form the rotor 36 having such a blisk structure by the integral molding. FIG. 9 is a perspective view showing an example of structure of the rotor of the compressor of the aircraft jet engine of FIG. 6, and the blisk 51 provided in an outer casing 48.

Figure 10:
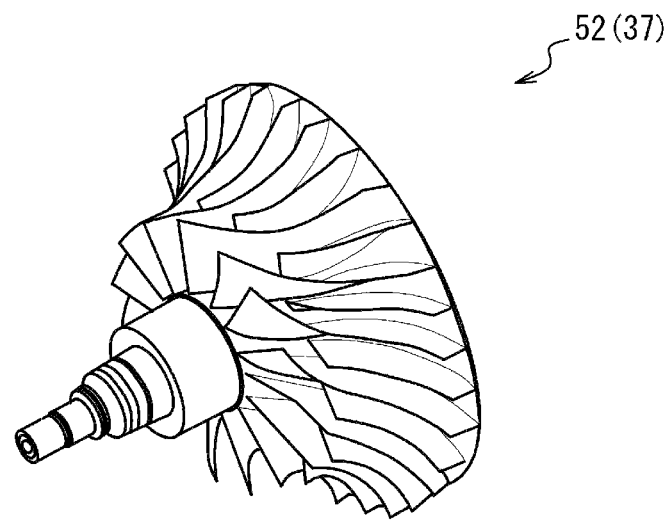
FIG. 10 is a perspective view showing an example of impeller in a stator structure of the compressor of the aircraft jet engine shown in FIG. 6.

FIG. 10 shows an example of structure of the stator 37 of the compressor 33 of the aircraft jet engine 30. The impeller 52 of the stator 37 has a hub and static blades. The static blades are united to the hub in the wing root. The injection molding by the above injection-molding machine 10 of the present embodiment is suitable to form the stator 37 of such an impeller structure by the integral molding.

In the above, the embodiments of the present invention have been specifically described. However, the present invention is not limited to the above-mentioned embodiments. It would be understood by the skilled person that the present invention can be implemented together with various changes or modifications. Moreover, components over the different embodiments may be combined appropriately.

The present invention is based on the Japanese Patent Application (JP 2017-034501) and claims a priority based on its application. The disclosure thereof is incorporated herein by reference.

The invention claimed is:

1. An injection-molding machine comprising:
a static mold;
a mold shaft inserted into an inner space of the static mold and having a central axis;
a raw material injection mechanism configured to inject a composite material containing thermoplastic resin and carbon fiber as a raw material into the inner space of the static mold; and
a rotation mechanism configured to rotate the mold shaft around the center axis when the raw material injection mechanism injects the raw material,
wherein the inner space has an impeller shape or a blisk shape,
wherein the raw material is injected into the inner space of the static mold along the mold shaft,
wherein the static mold has a concave section in which a tip section of the mold shaft is inserted, and
wherein the raw material is injected into the inner space of the static mold through a gap formed between the concave section and the mold shaft.

2. The injection-molding machine according to claim 1, further comprising:
a rectification mechanism located upstream of the static mold, arranged in an inside of a cylinder, and having a plurality of rectification wings.

3. The injection-molding machine according to claim 2, wherein the static mold has a throat receiving the raw material from the cylinder of the raw material injection mechanism,
wherein the raw material flows toward the tip section of the mold shaft from the throat, and
wherein the rectification mechanism is installed upstream of the throat in a flow of the raw material inside the cylinder.

4. An injection-molding machine comprising:
a mold;
a mold shaft inserted in an inner space of the mold and having a cylindrical side surface in the inner space;
a raw material injection mechanism configured to inject a composite material containing thermoplastic resin and carbon fiber as a raw material into the inner space of the mold; and
a rectification mechanism located upstream of the mold, arranged in an inside of a cylinder, and having a plurality of rectification wings,
wherein the inner space has an impeller shape or a blisk shape,
wherein the raw material is injected into the inner space of the mold along the mold shaft, and
wherein the rectification wings rectify a flow of raw material such that the flow of raw material turns around the mold shaft when injected into the inner space.

5. The injection-molding machine according to claim 4, wherein the mold has a concave section in which a tip section of the mold shaft is inserted, and
wherein the raw material is injected into the inner space of the mold through a gap formed between the concave section and the mold shaft.

6. The injection-molding machine according to claim 4, wherein the mold has a throat receiving the raw material from the cylinder of the raw material injection mechanism,
wherein the raw material flows toward the tip section of the mold shaft from the throat, and
wherein the rectification mechanism is installed upstream of the throat in a flow of raw material inside the cylinder.

\* \* \* \* \*